(12) United States Patent
Liou

(10) Patent No.: US 8,170,831 B2
(45) Date of Patent: May 1, 2012

(54) APPARATUS AND METHOD FOR MEASURING DIMENSION OF CIRCULAR OBJECT

(76) Inventor: Maw-Yuan Liou, Taipei County (TW)

( * ) Notice: Subject to any disclaimer, the term of this patent is extended or adjusted under 35 U.S.C. 154(b) by 345 days.

(21) Appl. No.: 12/453,075

(22) Filed: Apr. 29, 2009

(65) Prior Publication Data

US 2010/0280791 A1    Nov. 4, 2010

(51) Int. Cl.
*G01B 21/10* (2006.01)
*G06F 17/00* (2006.01)

(52) U.S. Cl. ........ 702/157; 702/155; 702/158; 702/149; 33/701

(58) Field of Classification Search .................. 702/157, 702/155, 158, 149
See application file for complete search history.

(56) References Cited

U.S. PATENT DOCUMENTS

| 4,148,388 | A | * | 4/1979 | Reyner et al. | 194/205 |
| 4,585,936 | A | * | 4/1986 | Sellier | 250/223 R |
| 4,815,579 | A | * | 3/1989 | Fritz | 194/318 |
| 5,662,205 | A | * | 9/1997 | Levasseur | 194/317 |
| 6,230,870 | B1 | * | 5/2001 | Levasseur et al. | 194/317 |

* cited by examiner

*Primary Examiner* — Hal Wachsman
(74) *Attorney, Agent, or Firm* — C. G. Mersereau; Nikolai & Mersereau, P.A.

(57) ABSTRACT

The invention provides an apparatus and a method for measuring a dimension of a circular object. First to third sensors arranged in a straight line are disposed above a track to respectively measure time instants when the circular object moves past the first to third sensors. The dimension of the circular object is calculated according to distances between the first and second sensors and between the second and third sensors.

5 Claims, 5 Drawing Sheets

APPARATUS AND METHOD FOR MEASURING DIMENSION OF CIRCULAR OBJECT

BACKGROUND OF THE INVENTION (1) Field of the Invention

The invention relates to a method of quickly determining a dimension of a circular object using sensors to measure time instants without the need of a ruler for measuring a diameter of the circular object.

(2) Description of the Prior Art

In the prior art for measuring a diameter of a coin, two sensors are disposed on a track on which the coin rolls in one method. The diameter of the coin is calculated according to time instants when the coin reaches and leaves the sensors, as shown in FIG. 4.

However, this dual-sensor design needs the longer stable track so that four time instants for the calculation of the diameter may be obtained. Referring to FIG. 4, if an equivalent chord length drawn by a circular object on the sensor is equal to C, and a gap between the sensors is equal to U, then the required minimum length of the stable track has to be equal to (C+U).

However, some coin inspection mechanisms have predetermined dimension limitations. For example, a top entry (falling type) coin inspection mechanism has the standard specification with the fixed smaller dimension. Because the dual-sensor design needs the longer stable track length, it is usually difficult to place the dual-sensor design into the coin inspection mechanism with the limited dimension.

SUMMARY OF THE INVENTION

In view of the above-identified problems mentioned in the background of the invention, the invention provides another method of disposing sensors in order to shorten the track length. Three sensors are disposed so that the required stable track length can be shortened to an equivalent chord length, which is always shorter than the diameter of the coin.

An objective of the invention is to provide an apparatus and a method for measuring a dimension of a circular object. First to third sensors arranged in a straight line are disposed above a track to respectively measure time instants when the circular object moves past the first to third sensors. The dimension of the circular object is calculated according to distances between the first and second sensors and between the second and third sensors. Thus, the invention can further measure the dimensions of continuously inserted objects.

Further aspects, objects, and desirable features of the invention will be better understood from the detailed description and drawings that follow in which various embodiments of the disclosed invention are illustrated by way of examples.

DETAILED DESCRIPTION OF THE PREFERRED EMBODIMENTS

In view of this, the present inventor develops a method of shortening the dimension of the track according to the learned knowledge and experience. Three sensors are disposed above the track such that the track length can be minimized to solve the conventional problem of the inconvenience in use and the conventional problem of the limited application range.

The direction of the invention discussed herein is an apparatus and a method for measuring a dimension of a circular object. In order to make the invention be clearly understood, detailed steps and components will be described in the following. The implementation of the invention is not limited to the special details of the dimension measurement apparatus and method known by one of ordinary skill in the art. On the other hand, the well known components or steps are not specified in detail to avoid the unessential limitations to the invention. The preferred embodiment of the invention will be described in the following.

Figure 1:
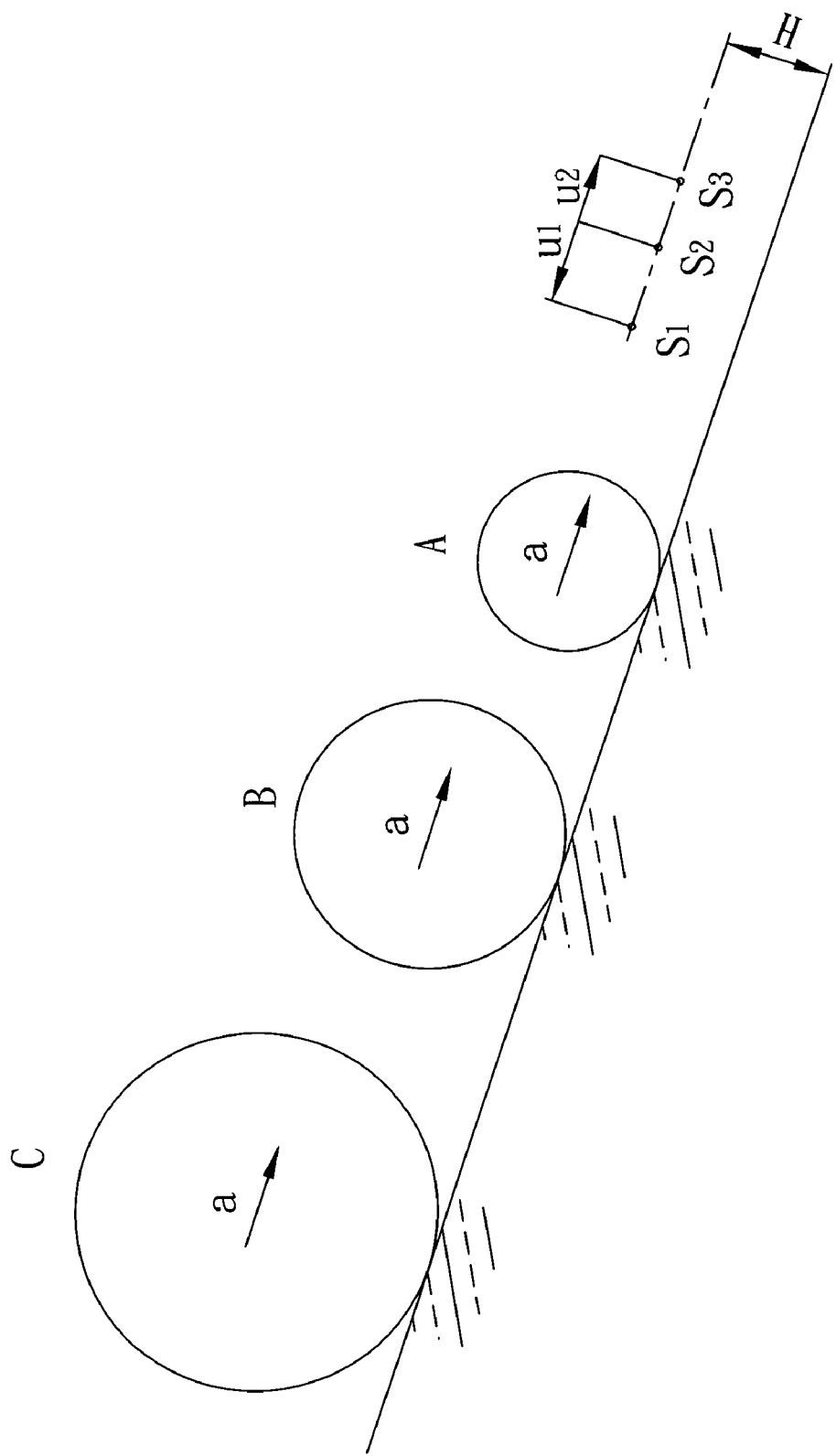
FIG. 1 is a schematic illustration showing an embodiment of the invention.

As shown in FIG. 1, the invention provides an apparatus for measuring a dimension of a circular object (also referred to as a to-be-measured object), and the apparatus is composed of a smooth track and first to third sensors. The distance between the first and second sensors is $u_1$, the distance between the second and third sensors is $u_2$, and the first to third sensors are disposed above the track at a height H. The to-be-measured objects A, B and C sequentially roll from left to right at a constant acceleration $\alpha$ (or at a constant velocity when $\alpha=0$). The leading edges of the to-be-measured objects sequentially reach the sensing point $S_1$ of the first sensor, the sensing point $S_2$ of the second sensor, and the sensing point $S_3$ of the third sensor. Thereafter, the trailing edges of the to-be-measured objects leave the first sensor $S_1$. The four time instants are respectively recorded as $t_0$, $t_1$, $t_2$, and $t_3$.

The track tilts to the horizontal surface, wherein the horizontal level of the first sensor is higher than the horizontal level of the second sensor and the horizontal level of the second sensor is higher than the horizontal level of the third sensor such that the to-be-measured object rolls or slides along the track and thus contacts the first sensor at an initial velocity $v_0$.

Figure 2A:
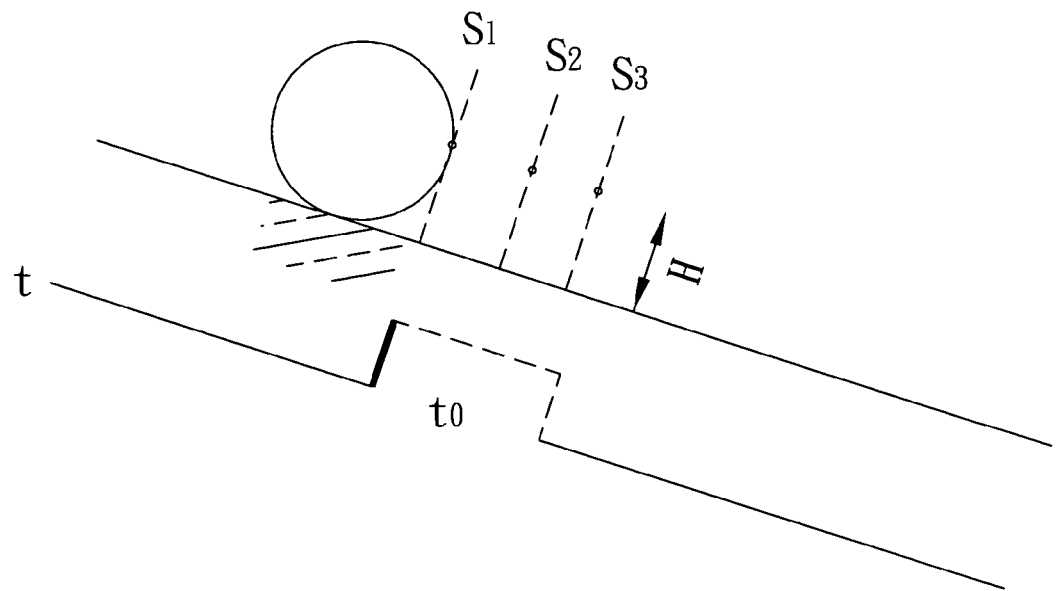
FIGS. 2A to 2D are schematic illustrations showing measurements obtained when a to-be-measured object sequentially moves past first to third sensors.
Figure 2B:
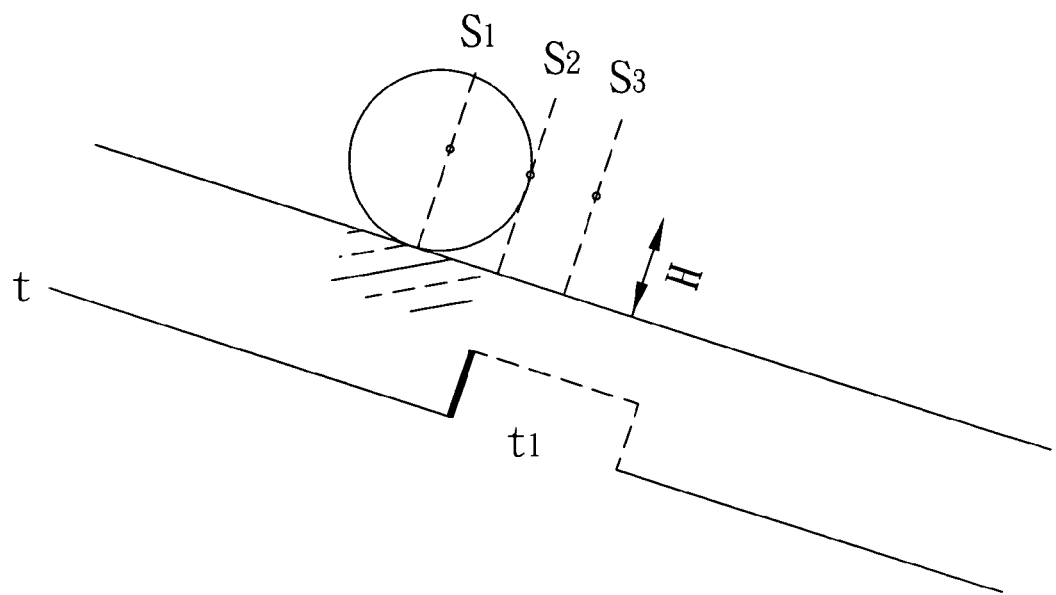

As shown in FIGS. 2A to 2D, when the to-be-measured object reaches the first sensor, the time instant $t_0$ when the to-be-measured object reaches the first sensor is recorded, as shown in FIG. 2A. Thereafter, when the to-be-measured object reaches the second sensor, the time instant $t_1$ when the to-be-measured object reaches the second sensor is recorded. For the sake of calculation, $t_0$ is defined as 0. Thus, the distance between the first and second sensors may be represented by $u_1 = v_0 t_1 + a t_1^2/2$, wherein the initial velocity $v_0$ may be represented as $v_0 = (u_1 - a t_1^2/2)/t_1 = u_1/t_1 - a t_1/2$.

Figure 2C:
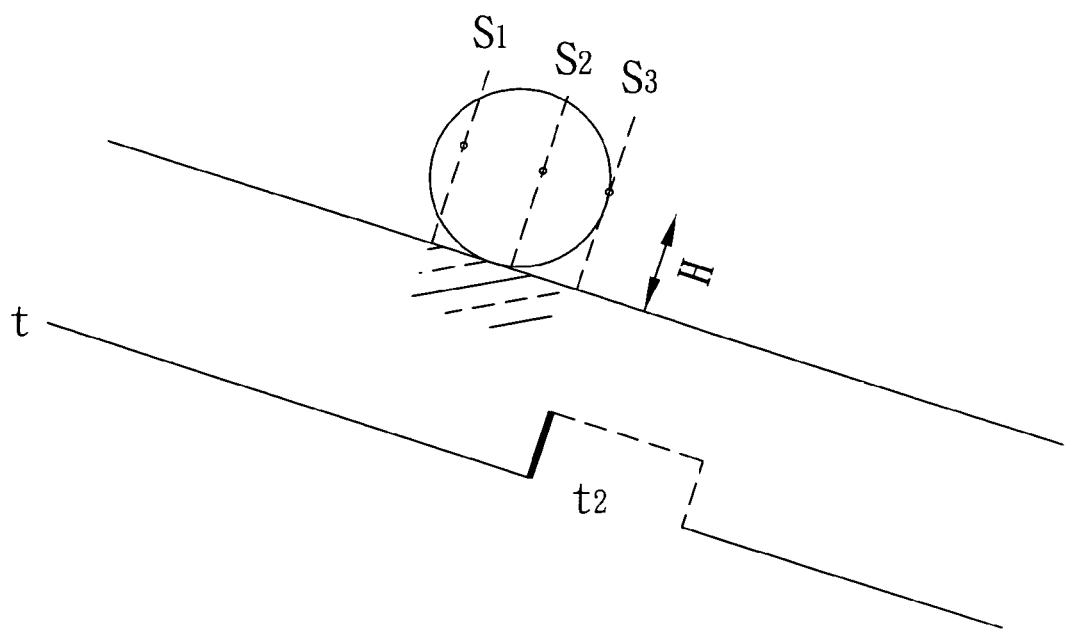
Figure 3:
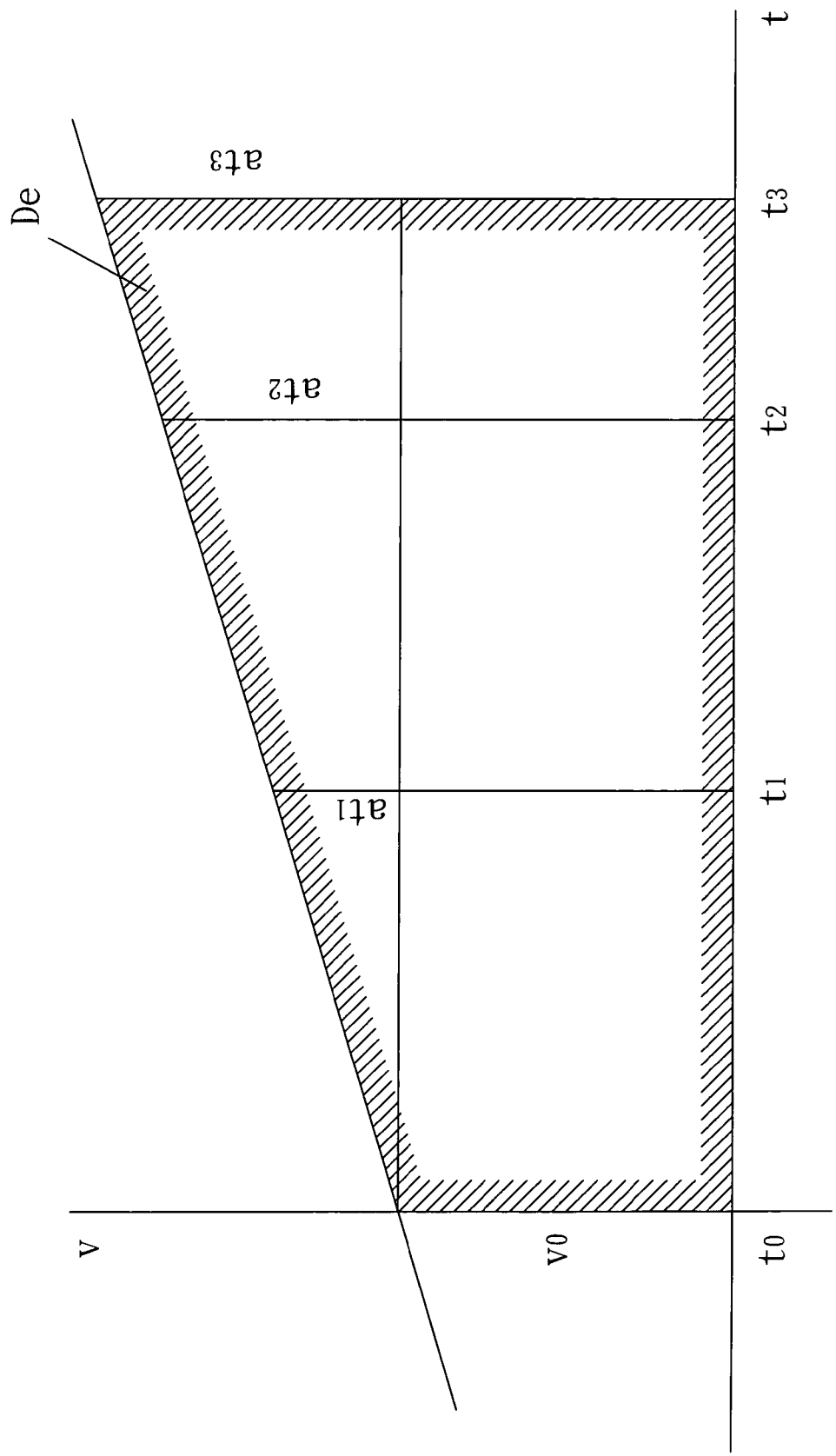
FIG. 3 shows the relationship between the velocity of the to-be-measured object and the time.
Figure 4:
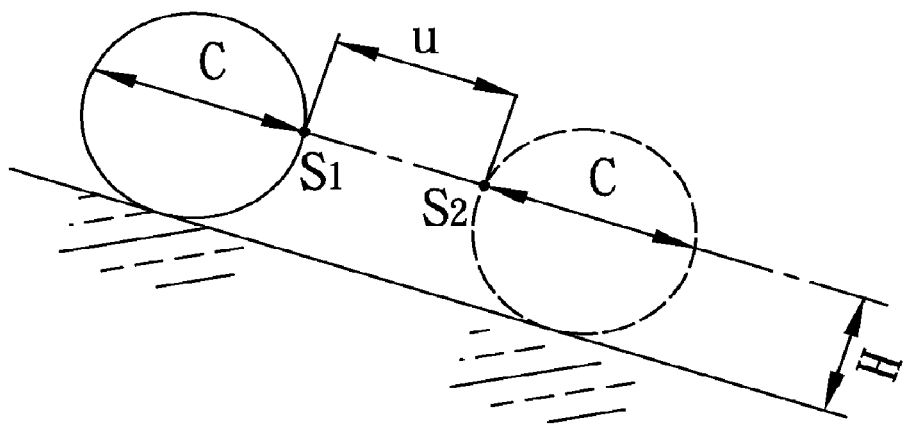
FIG. 4 shows a conventional method of measuring a diameter of a coin.

When the to-be-measured object reaches the third sensor, the time instant $t_2$ when the to-be-measured object reaches the third sensor is recorded, as shown in FIG. 2C. As shown in FIG. 3, the area of the upper trapezoid between $t_1$ and $t_2$ is equal to $(a t + a t_2)(t_2)/2 = a(t_2+t_1)(t_2-t_1)/2$, and the area of the lower rectangular between $t_1$ and $t_2$ is equal to $v_0 (t_2-t_1)$. The vertical axis of FIG. 3 represents the velocity v at which the to-be-measured object moves past each sensor, and the horizontal axis represents the time instant t when the to-be-measured object moves past each sensor.

However, according to the kinematics and geometry, the distance between the second and third sensors is equal to the sum of the above-mentioned two areas, and the distance between the second and third sensors is equal to $u_2 = v_0(t_2 -$ $t_1)+a(t_2+t_1)(t_2-t_1)/2 = u_1(t_2-t_1)/t_1+a(t_2-t_1)t_2/2$. Thus, the acceleration may also be calculated as $$a=2[u_2-u_1(t_2-t_1)/t_1]/t_2(t_2-t_1).$$

Figure 2D:
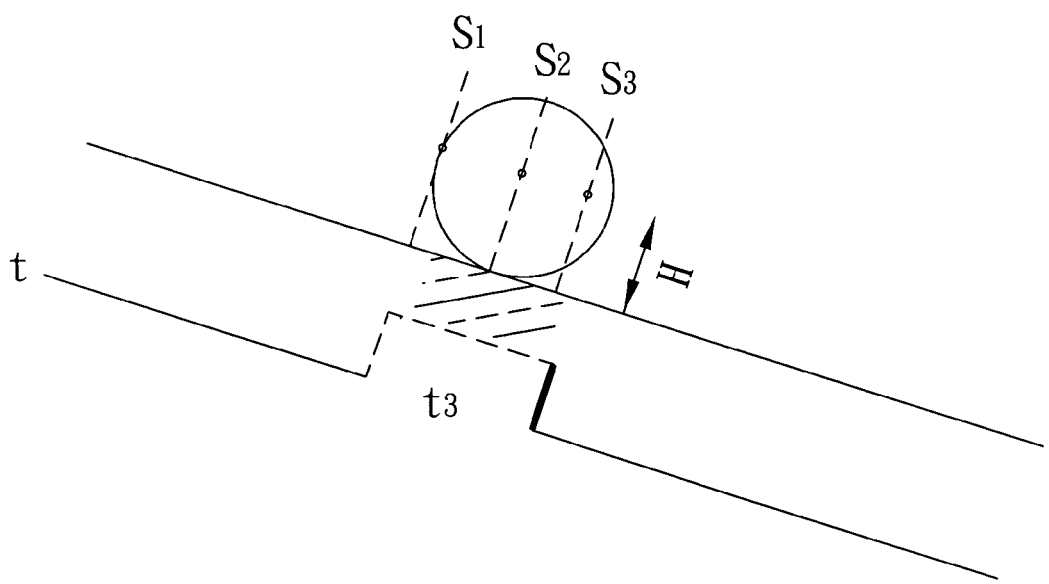

When the to-be-measured object leaves the first sensor, the time instant $t_3$ when the to-be-measured object leaves the first sensor is recorded, as shown in FIG. 2D. Thus, the chord length of the to-be-measured object drawn by the sensor may be calculated as $$D_e=u_1(t_3-t_1)+(t_3^2-t_3t_1)[u_2-u_1(t_2-t_1)/t_1]/t_2(t_2-t_1)$$

again according to the above-mentioned $v_0$ and $\alpha$. When the to-be-measured object is a coin, $D_e$ is a cord or an equivalent diameter of the coin.

The apparatus and method for measuring the dimension of the circular object according to the invention may be applied to the dimension control of steel balls, and may also be applied to the classification of coins in a coin inspection machine. The invention may have many modifications and changes according to the description of the embodiment. In addition to the detailed description, the invention may also be widely implemented in other embodiments.

New characteristics and advantages of the invention covered by this document have been set forth in the foregoing description. It is to be expressly understood, however, that the drawings are for the purpose of illustration only and are not intended as a definition of the limits of the invention. Changes in methods, shapes, structures or devices may be made in details without exceeding the scope of the invention by those who are skilled in the art. The scope of the invention is, of course, defined in the language in which the appended claims are expressed.

What is claimed is:

1. A method for measuring a dimension of a circular object using an apparatus comprising a track and first to third sensors above the track, a distance between the first and second sensors being $u_1$ and a distance between the second and third sensors being $u_2$, the method comprising:
    while the circular object is moving on the track, using the apparatus to record a time instant $t_0$ when the circular object reaches the first sensor, a time instant $t_1$ when the circular object reaches the second sensor, a time instant $t_2$ when the circular object reaches the third sensor, and a time instant $t_3$ when the circular object leaves the first sensor; and
    calculating a chord length of the circular object according to $D_e=u_1(t_3/t_1)(t_3^2-t_3t_1)[u_2-u_1(t_2-t_1)/t_1]/t_2(t_2-t_1)$; thereby determining the dimension of the circular object.

2. The method according to claim 1, wherein the time instant $t_0$ is defined as 0.

3. The method according to claim 1, wherein the track tilts to a horizontal surface, a horizontal level of the first sensor is higher than a horizontal level of the second sensor, and the horizontal level of the second sensor is higher than a horizontal level of the third sensor such that the circular object rolls or slides along the track and reaches the first sensor at an initial velocity.

4. The method according to claim 1, wherein the circular object is a coin, and $D_e$ is an equivalent diameter of the coin.

5. The method according to claim 1, wherein the circular object moves on the track at a constant velocity or a constant acceleration, and the first to third sensors are disposed above the track at predetermined heights.

* * * * *